UNITED STATES PATENT OFFICE.

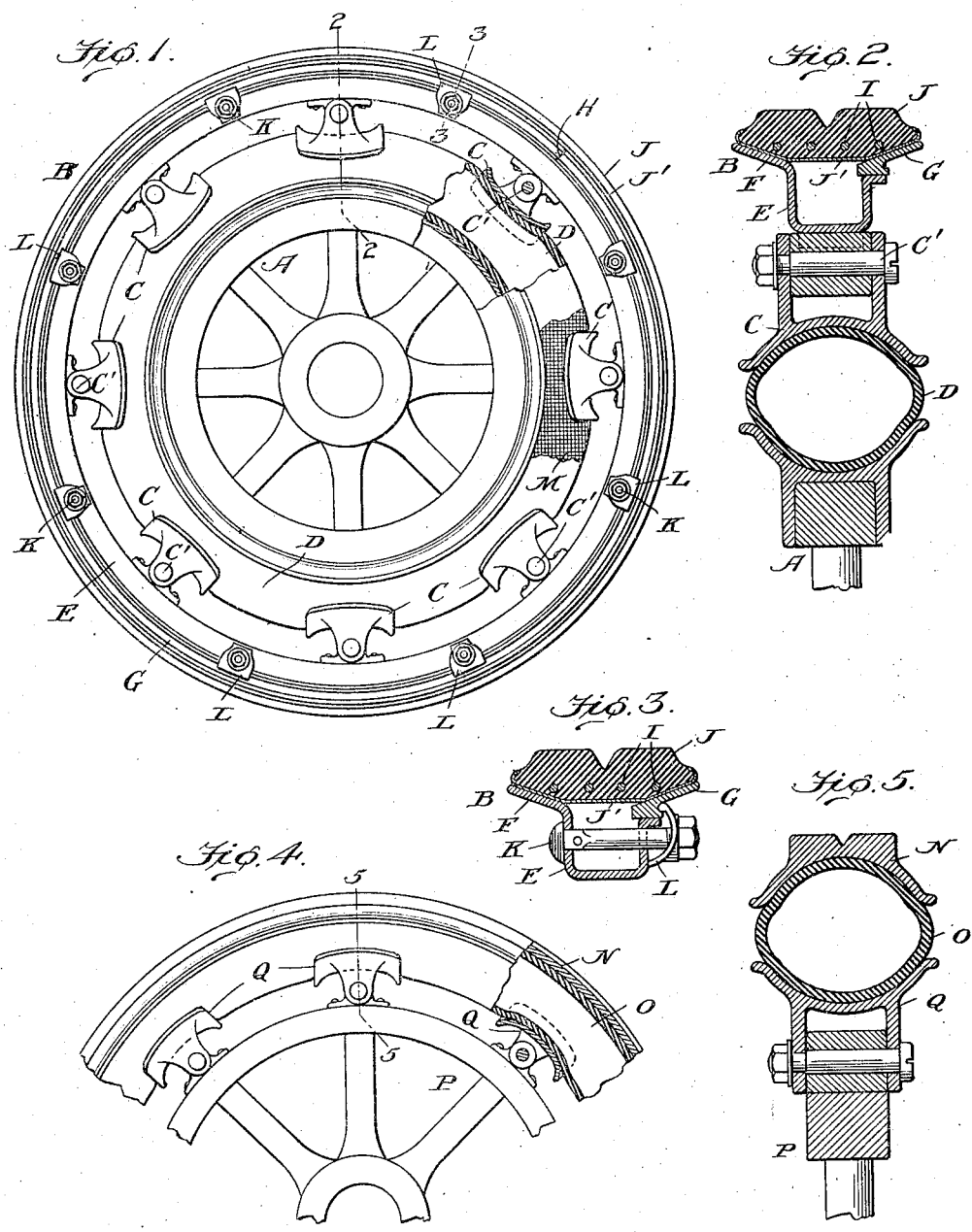

TIMOTHY C. DOBBINS, OF WALNUT PARK, CALIFORNIA.

RESILIENT WHEEL.

1,147,619.  Specification of Letters Patent.  Patented July 20, 1915.

Application filed August 26, 1914. Serial No. 858,713.

*To all whom it may concern:*

Be it known that I, TIMOTHY C. DOBBINS, a citizen of the United States, residing at Walnut Park, in the county of Los Angeles and State of California, have invented certain new and useful Improvements in Resilient Wheels, of which the following is a specification, reference being had therein to the accompanying drawing.

My invention relates especially to resilient wheels of that type in which a floating wheel rim member is separated from a concentric wheel center member by yielding devices, and its object is to combine extraordinary resiliency with increased safety, and many fold durability with low cost.

In the accompanying drawings, Figure 1 is a side elevation of a wheel embodying one form of my invention with portions broken away. Fig. 2 is a view from the left in Fig. 1, part of the wheel being shown in section on the line 2—2, Fig. 1. Fig. 3 is a section on the line 3—3, Fig. 1. Fig. 4 is a partial side elevation showing a modified arrangement. Fig. 5 is a section on the line 5—5, Fig. 4.

In these views, A represents a wheel center member having a concave or grooved felly or rim and in construction without novelty herein claimed.

B is a concentric primarily independent or floating rim member having its interior diameter much greater than the exterior diameter of the center member, and to this rim member are secured at short intervals inwardly projecting shoes C which are arranged to rock or swing in the plane of the wheel, with respect to the rim member, preferably being pivoted at C' to metal members rigidly fixed to the rim B. Between the shoes and the center member lies an elastic ring D, preferably a simple pneumatic tire, with its inner side held in the peripheral groove of the center member and its outer side similarly held in the several shoes each of which is curved transversly to nt the tire. Each shoe is also curved longitudinally so that its middle portion approximately fits the periphery of the tire while its end portions normally diverge slightly therefrom but move to and from the tire if the shoe rocks about its pivot.

The rim B, as shown in this instance, comprises a trough-like metal ring portion E having on one side a flaring flange F, and on the other side a similar independent annular flange, or ring member G which is divided at H so that the ring may be expanded. A tire member, removable as a whole, fits between and upon the flanges F, G, and may be of any desired material according to the service required of the wheel, but for ordinary automobiles it is preferably of rubber J molded about reinforcing rings I and molded in a thin steel casing J' enveloping its inner portion, and in hooked engagement therewith. This tire is put in place against the flange F, the flange ring G is added and forced against and under the inclined tire face by means of bolts K passing through the rim member E and clips L which engages the ring member G as shown, whereby the tire is rigidly clamped in place.

In use, the pneumatic tire is filled with air at far less pressure than that found necessary with common pneumatic tires. The weight instead of being borne at one point where the ordinary tire rests upon the road is distributed among the shoes on the lower side of the wheel, and hence only low air pressure is needed, resiliency is very greatly increased, and with this wheel a vehicle without springs gives the occupants less jarring and discomfort than the ordinary car, whether the road be smooth or rough. This result is largely due to the fact that there is nothing to prevent proper resilient yielding, as in many devices for this general purpose, since yielding occurs without material frictional resistance, there being no frictional resistance to longitudinal yielding of the tire as successive portions are successively compressed and slightly pulled by the weight, the several shoes simply rocking upon their pivots without appreciable friction. This rocking is otherwise of great moment since there is no great longitudinal strain on the tire, and wear upon its surface is almost entirely prevented.

The tire may be protected from deteriorating action of the sun and rain, and incidentally from even the slight surface wear of the shoes, by covering its surface with canvas, or other suitable material, as indicated at M.

It may be remarked that the resilient member between the center member and the shoes is not necessarily continuous or of one piece. The tire circle being of small radius and the tire thinner than ordinary tires, since it sustains only low pressure, the saving in rubber and cost of construction is very great.

In Figs. 4 and 5 I have shown a modified construction wherein the outer rim member N holds the outer side of the tire O in an annular groove, and the wheel center member P carries the radial rocking shoes Q. The action of this form is analogous to that of the form first described, but as the tire circle is greater the tire is far more expensive.

What I claim is:

1. In a resilient wheel, the combination with a wheel center member and a distinct concentric, substantially inflexible rim member of materially greater diameter, of a highly compressible resilient device located between said members and borne by one of them, and a series of devices each mounted on the other member to rock freely in the plane of the wheel, each normally projecting radially from its support, normally pressing the resilient devices and adapted to vary its compressive action upon the resilient device whenever it rocks on its support; whereby substantially the entire force of load thrusts is expended in direct compression of the resilient device, without material strain or slipping of the compressing devices upon the resilient member.

2. In a resilient wheel, the combination with a wheel center member and a concentric substantially inflexible rim member of materially greater diameter, of a series of projections each mounted on one of said members to rock freely in the plane of the wheel and each having a working face eccentric with respect to the axis upon which it rocks, and a highly compressible device extending from each of said projections to the other of said members, whereby rocking of each projection varies its compressive effect upon the compressible device; the projections being at intervals insuring the transmission of load at all times through a plurality of them.

3. In a resilient wheel, the combination with a wheel center member and a distinct substantially inflexible rim member separated from the center member by a normally uniform annular space, of a resilient tire partially filling said space and lying in a groove in one of said members, and a series of shoes mounted on the other member to rock in the plane of the wheel, having grooved faces resting against the adjacent face of said tire, each of the latter faces being adapted to vary in compressive effect upon the tire when the shoe is thus rocked.

4. In a resilient wheel, the combination with a wheel center member and a distinct substantially inflexible rim member separated from the center member by a uniform annular space, of a pneumatic tire partially filling said space and lying in a groove in one of said members, and shoes mounted on the other member to rock freely in the plane of the wheel, each having a tire-pressing grooved face curved longitudinally and eccentric with respect to the axis of its rocking movement; said shoes being spaced at intervals insuring the transmission of load at all times through a plurality of them.

5. In a resilient wheel, the combination with a wheel center member, of a concentric, substantially inflexible rim member encircling the center member and spaced therefrom, an endless tire-like pneumatic tube mounted in a channel in one of said members and extending partly across the space between the two, and a series of spaced shoes resting upon the tube, pivoted to the opposite member to rock in the plane of the wheel, and each having its tube pressing face curved from the tube at each end and gradually increasing, on each side of its middle point, in distance from its pivot.

In testimony whereof I affix my signature in presence of two witnesses.

TIMOTHY C. DOBBINS.

Witnesses:
JAMES L. CRAWFORD,
C. NOBLE BELT.

Copies of this patent may be obtained for five cents each, by addressing the "Commissioner of Patents, Washington, D. C."